United States Patent
Sinicrope et al.

(10) Patent No.: US 7,706,304 B2
(45) Date of Patent: Apr. 27, 2010

(54) METHOD AND SYSTEM FOR ASSIGNING ROUTERS TO HOSTS

(75) Inventors: David Sinicrope, Cary, NC (US); Chirayu Shah, Cary, NC (US); Mahmood Hossain, Cary, NC (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 292 days.

(21) Appl. No.: 11/766,377

(22) Filed: Jun. 21, 2007

(65) Prior Publication Data

US 2008/0317049 A1 Dec. 25, 2008

(51) Int. Cl.
*H04L 12/28* (2006.01)

(52) U.S. Cl. .................. 370/254; 370/410; 709/220; 455/435.2

(58) Field of Classification Search .............. None
See application file for complete search history.

(56) References Cited

U.S. PATENT DOCUMENTS

| | | | | |
|---|---|---|---|---|
| 7,190,678 B2 * | 3/2007 | Thubert et al. | ............... | 370/254 |
| 7,203,175 B2 * | 4/2007 | Thubert et al. | ............... | 370/254 |
| 7,209,978 B2 * | 4/2007 | Thubert et al. | ............... | 709/242 |
| 7,362,729 B2 * | 4/2008 | Omae et al. | ................. | 370/331 |
| 7,366,111 B2 * | 4/2008 | Thubert et al. | ............... | 370/254 |
| 7,428,221 B2 * | 9/2008 | Thubert et al. | ............... | 370/255 |
| 2003/0069990 A1 * | 4/2003 | D'Annunzio et al. | ........ | 709/242 |
| 2004/0081152 A1 | 4/2004 | Thubert et al. | | |
| 2007/0030855 A1 * | 2/2007 | Ribiere et al. | ................ | 370/401 |
| 2007/0099649 A1 * | 5/2007 | Han et al. | ................... | 455/525 |
| 2007/0160064 A1 * | 7/2007 | Kwon et al. | ............ | 370/395.52 |
| 2007/0268865 A1 * | 11/2007 | Garcia et al. | ................. | 370/331 |

OTHER PUBLICATIONS

R. Draves, et al.,Default Router Preferences and More-Specific Routes, RFC 4191, 2005.
T. Narten, et al, "Neighbor Discovery for IP Version 6 (IPv6)" RFC 2461, Dec. 1998.

* cited by examiner

*Primary Examiner*—Daniel J Ryman
*Assistant Examiner*—Brian Roberts

(57) ABSTRACT

A system and method in an IP-based network for defining a specific router for a host to utilize as a default router. The host is configured with a plurality of preferred correlation values, each of which has a different corresponding preference level. Routers send Router Advertisement (RA) messages to the host and include at least one router correlation value and at least one corresponding priority value. The host compares the received router correlation values with its preferred correlation values and identifies the router that sent the router correlation value that matched the preferred correlation value having the highest corresponding preference level. The identified router is selected as the host's default router. If more than one router matches the preferred correlation value having the highest corresponding preference level, the router that sent the highest priority value is selected.

15 Claims, 7 Drawing Sheets

METHOD AND SYSTEM FOR ASSIGNING ROUTERS TO HOSTS

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

The present invention relates to routers and hosts in an Internet Protocol (IP) network. More particularly, and not by way of limitation, the present invention is directed to a system and method for assigning routers to hosts in IP Version 6 (IPv6) networks.

Currently IPv6 routers use a mechanism called Neighbor Discovery (or Router Discovery) for stateless auto-configuration of IPv6 host systems. The Neighbor Discovery mechanism is described in T. Narten, et al., "Neighbor Discovery for IP Version 6 (IPv6)," RFC 2461, 1998, which is incorporated herein by reference. Nodes (hosts and routers) use the Neighbor Discovery mechanism to determine the link-layer addresses for neighbors known to reside on attached links and to quickly purge cached values that become invalid. The Router Discovery function of the Neighbor Discovery mechanism allows the hosts to solicit or periodically be updated with prefix and default router information. As such, the Router Discovery protocol introduces two types of messages: a) Router Solicitation (RS) messages and b) Router Advertisement (RA) messages. In addition, hosts use Router Discovery to find neighboring routers that are willing to forward packets on their behalf. Finally, nodes use a Neighbor Discovery protocol suite to actively keep track of which neighbors are reachable and which are not, and to detect changed link-layer addresses. When a router or the path to a router fails, a host actively searches for functioning alternates.

Hosts send RS messages in order to prompt routers to generate RA messages quickly. Routers send out Router Advertisements periodically, or in response to a Router Solicitation. The Router Advertisements indicate various router characteristics and whether the router is available as a default router. Hosts populate their Default Router List and Prefix List based on information in the Router Advertisements. A conceptual sending algorithm uses the Prefix List to determine if a destination address is on-link and uses the Default Router List to select a router for off-link destinations. In some network topologies where the host has multiple routers on its Default Router List, the choice of router for an off-link destination is important. In some situations, one router may provide much better performance than another for a given destination. In other situations, choosing the wrong router may result in a failure to communicate.

An extension to the Router Advertisement message for communicating default router preferences and more-specific routes from routers to hosts is described in R. Draves, et al., "Default Router Preferences and More-Specific Routes," RFC 4191, 2005. This improves the ability of hosts to pick an appropriate router, especially when the host is multi-homed and the routers are on different links. The preference values and specific routes advertised to hosts require administrative configuration; they are not automatically derived from routing tables.

In scalable, high speed networks, more than one IPv6 router may not be adequate to serve the capacity requirements of the servers or hosts on a given local area network (LAN). In this situation, it becomes necessary to provision the routers and divide the host traffic load between them. However, it is not always feasible or cost effective to add load balancing equipment to spread the server load across multiple routers. In this case, the best solution is to divide the servers amongst the multiple routers based on policy or some other provisioning or dimensioning exercise.

The methods disclosed in RFC 2461 and RFC 4191 allow the host to choose which router it uses based on criteria presented in the RA messages. Using these methods, however, a disproportionate number of hosts may choose the same router to serve as their default router. A finer granularity and stricter control is needed while maintaining the auto-configuration from the host point of view It would be advantageous to have a system and method for assigning routers to hosts that overcomes the disadvantages of the prior art. The present invention provides such a system and method.

BRIEF SUMMARY OF THE INVENTION

The present invention extends standard Router Discovery methods to provide a correlation process that deterministically tells the host precisely which router it should be using for its default router. The invention provides several advantages over the prior art. The invention allows the operator to design and configure the host distribution from the routers with minimal configuration on the hosts themselves. It allows deterministic host load distribution over multiple routers. It allows host load distribution across multiple routers without extra equipment or substantial additional functionality. A simple protocol enhancement, straight forward configuration, and simple process provide low development cost. The invention provides low maintenance cost because it utilizes low complexity code and does not raise interoperability issues.

Additionally, the invention is easy and straight forward to operate because it uses correlation values and priorities that are simple to manipulate. Flexibility is provided because the operator can use the correlation values and priorities to meet the needs of a particular deployment or application. For example, the operator can use them to configure 1:1, N:1, or N:M distributions depending on the correlation values and priorities that are set. The invention is highly scalable; as routers are added or removed, the hosts dynamically use them or move to alternative routers. The invention is resilient; if a router stops advertising, the next highest priority router is selected as a replacement or backup. Finally, the invention is backward compatible; the invention does not prohibit standard Router Discovery operation with devices that do not support it.

Thus, in one aspect, the present invention is directed to a method in an Internet Protocol (IP)-based network for defining to a host, a specific router for the host to utilize as a default router. The method includes the steps of configuring routers in the network to add selection information to Router Advertisement messages sent to the host; and configuring the host to utilize the selection information to select a default router.

In another aspect, the present invention is directed to a method in an Internet Protocol (IP)-based network for defining to a host, a specific router for the host to utilize as a default router. The method includes configuring in the host, a preferred correlation value associated with routers from which the host receives Router Advertisement messages; receiving a Router Advertisement message from a given router, the Router Advertisement message including a router correlation value; and comparing by the host, the router correlation value received in the Router Advertisement message with the preferred correlation value configured in the host. If the router correlation value received in the Router Advertisement message does not match the preferred correlation value, the host selects a default router from a list of candidate default routers based on advertised router characteristics. If the router correlation value received in the Router Advertisement message matches the preferred correlation value, the host selects the given router as the host's default router.

In another aspect, the present invention is directed to a method in an IP-based network for defining to a host, a specific router for the host to utilize as a default router. The method includes configuring in the host, a plurality of correlation values associated with routers from which the host receives Router Advertisement messages; assigning a different preference level to each configured correlation value; and receiving a Router Advertisement message from a given router, the Router Advertisement message including a router correlation value. The host compares the router correlation value received in the Router Advertisement message with the plurality of correlation values configured in the host, and if the router correlation value received in the Router Advertisement message matches a configured correlation value having a higher preference level than the host's current default router, the host selects the given router as the host's new default router. If the router correlation value received in the Router Advertisement message does not match a configured correlation value having a higher preference level than the host's current default router, the host retains the host's current default router as the host's default router.

In yet another aspect, the present invention is directed to a method in an IP-based network for defining to a host, a specific router for the host to utilize as a default router. The method includes configuring in the host, a plurality of correlation values associated with routers from which the host receives Router Advertisement messages, wherein each configured correlation value has a different corresponding preference level; receiving a plurality of Router Advertisement messages from a plurality of routers, each of the Router Advertisement messages including at least one router correlation value and at least one corresponding priority value; and identifying by the host, matching pairs of received router correlation values and configured correlation values. The host also identifies which matching pair of correlation values has the highest corresponding preference level, and identifies the router that sent the router correlation value in the matching pair having the highest corresponding preference level. The host then selects the identified router as the host's current default router.

In yet another aspect, the present invention is directed to a system within a host processor in an IP-based network for defining a specific router for the host to utilize as a default router. The system includes a plurality of routers configured to add selection information to Router Advertisement messages sent to the host; and selecting means within the host for utilizing the selection information to select a default router.

In yet another aspect, the present invention is directed to a system within a host processor in an IP-based network for defining a specific router for the host to utilize as a default router. The system includes a communications interface for receiving a plurality of Router Advertisement messages from a plurality of routers, each of the Router Advertisement messages including at least one router correlation value and at least one corresponding priority value; a first memory device for storing the received router correlation values and corresponding priority values; and a second memory device for storing a plurality of correlation values preferred by the host, wherein each preferred correlation value has a different corresponding preference level. The system also includes a comparison unit for identifying matching pairs of received router correlation values and preferred correlation values and for identifying a router that sent the router correlation value that matched the preferred correlation value having the highest corresponding preference level; and an enhanced default router selection unit for selecting the identified router as the host's default router.

BRIEF DESCRIPTION OF THE SEVERAL VIEWS OF THE DRAWING

In the following section, the invention will be described with reference to exemplary embodiments illustrated in the figures, in which:

FIG. 5B is a continuation of the flow chart of FIG. 5a;

FIG. 6B is a continuation of the flow chart of FIG. 6a; and.

DETAILED DESCRIPTION OF THE INVENTION

Figures 1, 2, 3:
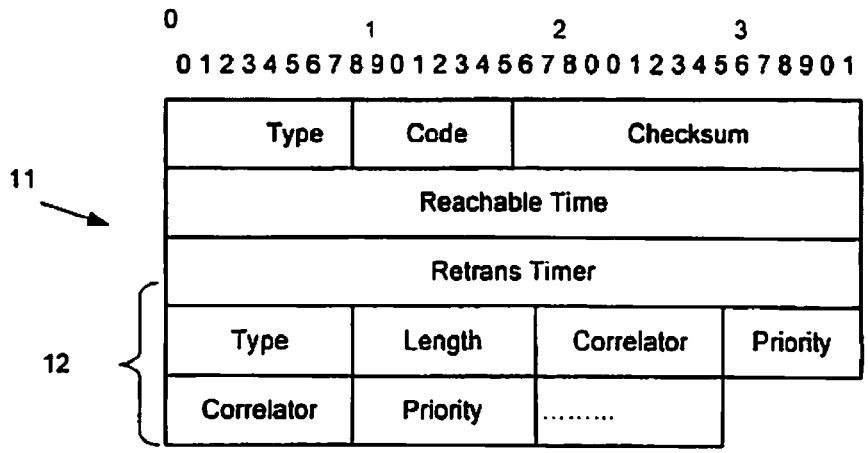
FIG. 1 is an exemplary illustration of a message format for a Router Advertisement message modified in accordance with the teachings of one embodiment of the present invention.
FIG. 2 is an exemplary illustration of a correlation table implemented in a host.
FIG. 3 is an exemplary illustration of a table populated with Router Advertisement information.

In RFC 2461, a host may send a router solicitation to determine which routers it may use as a default router and what its prefixes to those networks are. In addition, a router may periodically advertise that it can be used as a default router. However, RFC 2461 does not provide a mechanism for conveying to the host, the preference or priority to use a specific router as its default router in the situation where the host is multi-homed, i.e., connected to the IP network by more than one router.

In one embodiment, the present invention adds signaling information to the Router Advertisement that tells the host precisely which router to use as its default router. This is true of advertisements that are sent periodically or as a result of a solicitation. If a particular host does not recognize the signaling enhancements, the host silently ignores the enhancements, and the Router Discovery protocol operates according to RFC 2461.

In one embodiment, the present invention specifies that a correlation value is configured in each host and in each router. Each router sends its correlation value in its Router Advertisements. The "options" field in the RA message may be utilized to send the correlation value as DCM TLV. For each received Router Advertisement, solicited or not, the host attempts to match its configured correlation value with the one received from a given router. If the correlation values encoded in DCM TLV do not match or a DCM TLV is not present, the advertised router is used as a candidate for its default router according to RFC 2461. If the correlation values match, the host uses the corresponding router as its default router. In the event that two routers send the same matching correlation value, the host must determine which to use. In this case, the host may utilize the standard method of selection per RFC 2461 amongst the routers sending the same correlation values.

This embodiment is simple in function and operation, and it provides deterministic load distribution. However, this embodiment leaves little flexibility for resiliency or more complex topologies.

In another embodiment, a table of correlation values and their associated priorities is configured in each router and is passed with any Router Advertisements sent. The "options" field in the RA message may be utilized to send the correlation table information as DCM TLV. Apriori, the hosts that may use these routers are configured with a table of one or more correlation values in order of precedence. When a Router Advertisement message is received by the host the correlation table is extracted and compared against the host's table of values.

By configuring both the correlation value and its priority, this embodiment enables routers to be used in two different ways—as backups or as active load balancers. For example, if the values (32:1, 32:2) are configured as the correlation precedence list on all hosts, then 32:2 will always be a backup for all hosts. Instead, if the values (32:1, 32:2) are configured on host1 and the values (32:2, 32:1) are configured on host2, both 32:1 and 32:2 routers are used to forward traffic. Hosts which do not understand the DCM TLV option type will ignore the option and process the remainder of the message according to RFC2461. This provides backward compatibility with hosts that do not support this invention.

FIG. 1 is an exemplary illustration of a message format for a Router Advertisement message 11 modified with optional Router Discovery Correlation Message with type-length-value (TLV); herein abbreviated as DCM TLV, in accordance with the teachings of one embodiment of the present invention. The router may use the "options" field 12 in the RA message to send one or more correlation values and priority values for the router encoded as DCM TLV. The correlation values and priority values are shown to be eight bits in length, although other lengths may also be utilized.

FIG. 2 is an exemplary illustration of a correlation table 15 implemented in a host where a pair of <correlation value, index> entries are configured on each host. Index values 16 indicate an order of precedence for the correlation values 17. In this case, the correlation value 32 is preferred and the value 24 is of secondary precedence.

FIG. 3 is an exemplary illustration of a table 21 populated with Router Advertisement information. The host populates this table with information received in Router Advertisements from various routers. The table includes a list of correlation values 22, an associated priority 23 for each correlation value, and a corresponding router identification (router ID) 24 for the router that sent the RA message from which the information on that row was obtained.

Figure 4:
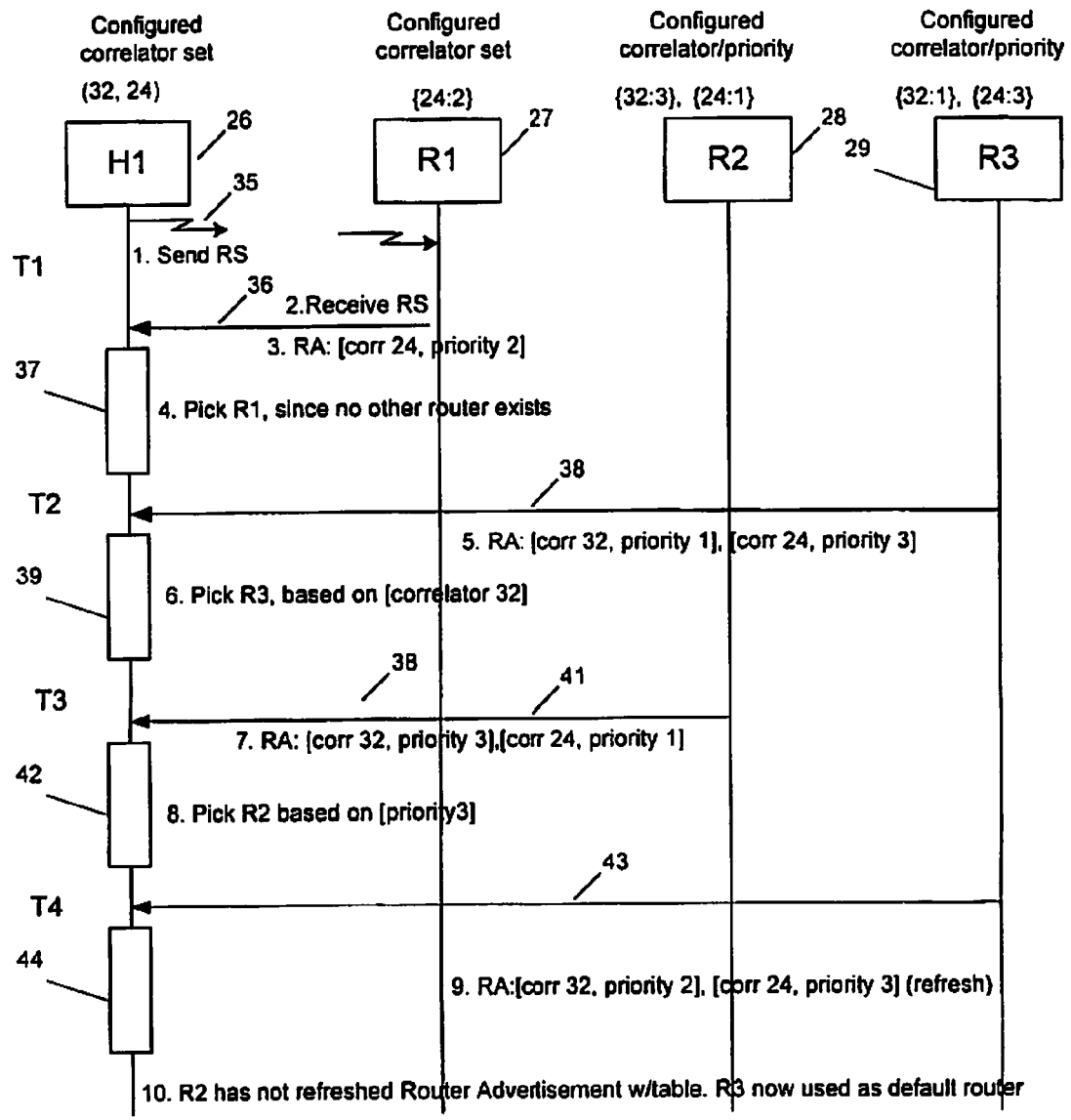
FIG. 4 is an exemplary call flow diagram illustrating an embodiment of the Router Advertisement correlation process of the present invention.

FIG. 4 is an exemplary call flow diagram illustrating an embodiment of the Router Advertisement correlation process of the present invention. In general, the host H1 26 always uses the router that is highest on its precedence list and has sent the highest priority in its RA for the matching correlation value. For example: Assume host H1 is configured with the table 15 (FIG. 2) with correlation values "32" and "24" in that order of precedence. Also assume three routers: R1 27 with table (24:2), R2 28 with table (32:3, 24:1) and R3 29 with table (32:1, 24:3). H1 first tries to match on the correlation value that is highest in its table (i.e., "32"). If a match exists, the router that sent the value of "32" is assigned the corresponding priority of usage based on the priority in the Router Advertisement message. If no higher priority router has been seen, then the host uses the router as its default router.

At time T1, H1 26 sends a RS message 35 to R1 27 and receives an RA message 36 in response. The RA message includes R1's correlation/priority values of (24:2). H1 compares these values against its correlation table. Since there is no match in R1's information for "32", H1 uses the entry for "24". No other Router Advertisements are received, so H1 selects R1 as its default router at 37.

At a later time T2, R3 29 sends an RA message 38 to H1 with its correlation/priority values of (32:1), (24:3). H1 compares these values against its correlation table. H1 matches the correlation value "32" which has a higher precedence than the value "24" received from R1. Therefore, at 39, H1 then begins to use R3 as its default router.

At a later time T3, R2 28 sends an RA message 41 to H1 with its correlation/priority values of (32:3), (24:1). H1 compares these values against its correlation table. H1 matches the correlation value "32" again and determines that it already has a match for "32". At 42, H1 selects R2 as its default router based on the priority value of three (3).

At a later time T4, R3 sends another RA message 43 to refresh its correlation/priority values. The correlation/priority values are now (32:2), (34:3). If R2 does not refresh its correlation/priority values, H1 reselects R3 as its default router at 44. Alternatively, if neither R2 nor R3 refresh their information, H1 reselects R1 as it default router.

If two routers send the same correlation and priority value, and the correlation value is the highest precedence in H1's table, H1 may select one of the routers at its discretion. For example, H1 may utilize the method of RFC 2461 to select its default router from the set of routers identified by the matching correlation and priority values.

In this way, hosts can be configured with correlation values corresponding to the preference of which router they should select as their default router. This may correspond, for example, to selection of a router in the same LAN, or can be applied to a multihomed situation where the host uses the correlation value to determine which ISP shall be preferred.

Note that because H1's correlation table 15 is listed in the order of precedence, it is not possible to select two routers to use in a load balancing environment. The table can be extended to allow multiple correlation values per table entry. In this case, H1 would divide its load between the routers identified in the table row. It should be noted that the role of the priority does not change. If a Router Advertisement is received with a correlation value matching one in the highest row in H1's table, and with a priority that exceeds that of the currently assigned router, then the router that sent the advertisement with the higher priority replaces the lower priority router in the load distribution. A host can also load balance amongst all routers in its table.

The customer or carrier can also use the correlation values and priorities to represent any distribution policy. Also the systems can be provisioned, or re-provisioned, at any point using standard OAM methods (for example, SNMP, XML and a central OSS).

Figure 5A:
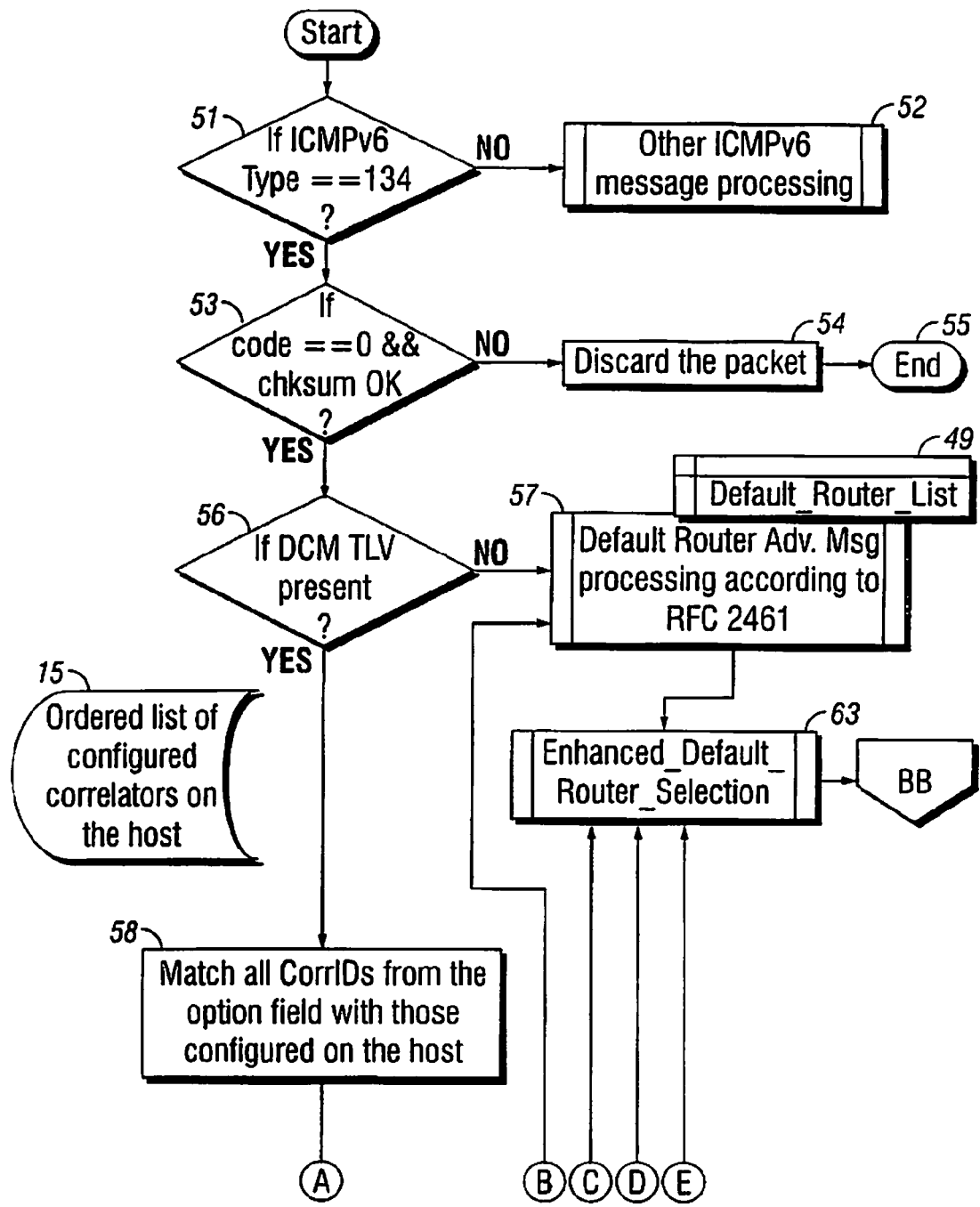
FIG. 5A is a portion of a flow chart illustrating the steps of an exemplary embodiment of the method of the present invention wherein a host processes Router Advertisement Messages.
Figure 5B:
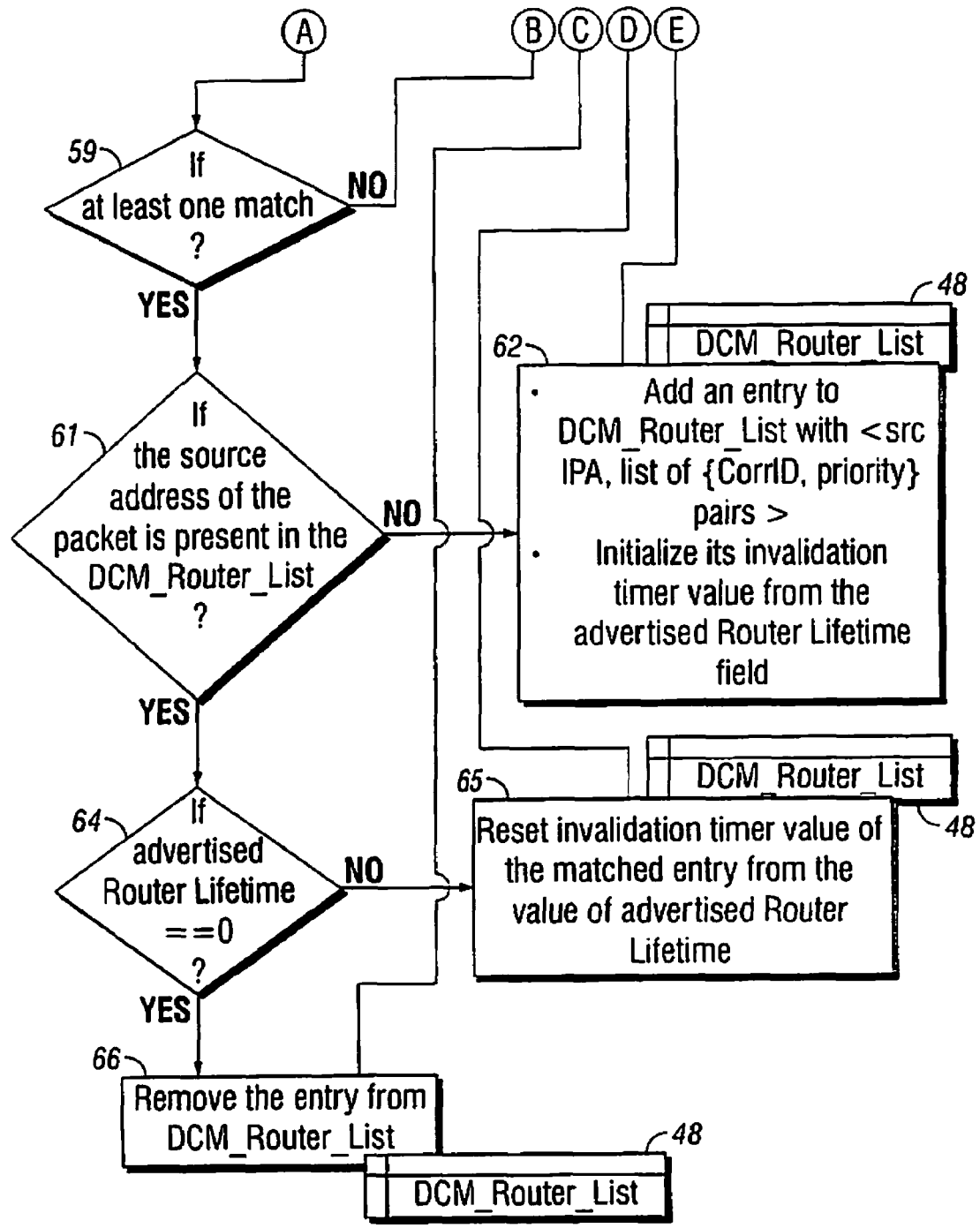

FIG. 5 is a flow chart illustrating the steps of an exemplary embodiment of the method of the present invention wherein a host processes Router Advertisement messages. In general, the process in FIG. 5 extends the RFC recommended steps by first processing an RA message to see if it can be included in an DCM_Router_List 48, and if not (because either the RA message does not include the DCM TLV option or the correlation value does not match) then that router's address is included in an RFC-compliant Default_Router_List 49.

At step 51, it is determined whether the ICMPv6 type equals 134. If not, the process moves to step 52 where other ICMPv6 processing is performed. However, if the ICMPv6 type equals 134, the process moves to step 53 where it is determined whether a code equals zero and a checksum is validated. If not, the process moves to step 54 where the packet is discarded. The process then ends at step 55.

However, if the code equals zero and the checksum is validated, the process moves to step 56 where it is determined whether a DCM TLV is present. If not, the process moves to step 57 where default Router Advertisement message processing is performed according to RFC 2461. The default Router Advertisement message processing produces the RFC-compliant Default_Router_List 49.

However, if the DCM TLV is present, the process moves to step 58 where the host matches all of the correlation IDs from the option field of the RA message with the table of correlation values 15 configured on the host. At step 59, it is determined whether there is at least one match. If not, the process returns to step 57 where default Router Advertisement message processing is performed according to RFC 2461. However, if there is at least one match, the process moves to step 61 where it is determined whether the source address of the packet is present in the DCM_Router_List 48. If not, the process moves to step 62 an entry is added to the DCM_Router_List with a router ID and a list of pairs of correlation values and priorities received in the RA message. The host also initializes its invalidation timer value from the advertised Router Lifetime field. The process then moves to step 63 where an Enhanced_Default_Router_Selection process (FIG. 6) is performed.

However, if it is determined at step 61 that the source address of the packet is already present in the DCM_Router_List 48, the process moves to step 64 where it is determined whether the advertised Router Lifetime equals zero. If not, the process moves to step 65 where the host resets the invalidation timer value of the matched entry from the value of the advertised Router Lifetime. The process then moves to step 63 where the Enhanced_Default_Router_Selection process (FIG. 6) is performed. However, if it is determined at step 64 that the advertised Router Lifetime equals zero, the process moves to step 66 where the entry is removed from the DCM_Router_List 48. The process then moves to step 63 where the Enhanced_Default_Router_Selection process (FIG. 6) is performed.

Figure 6A:
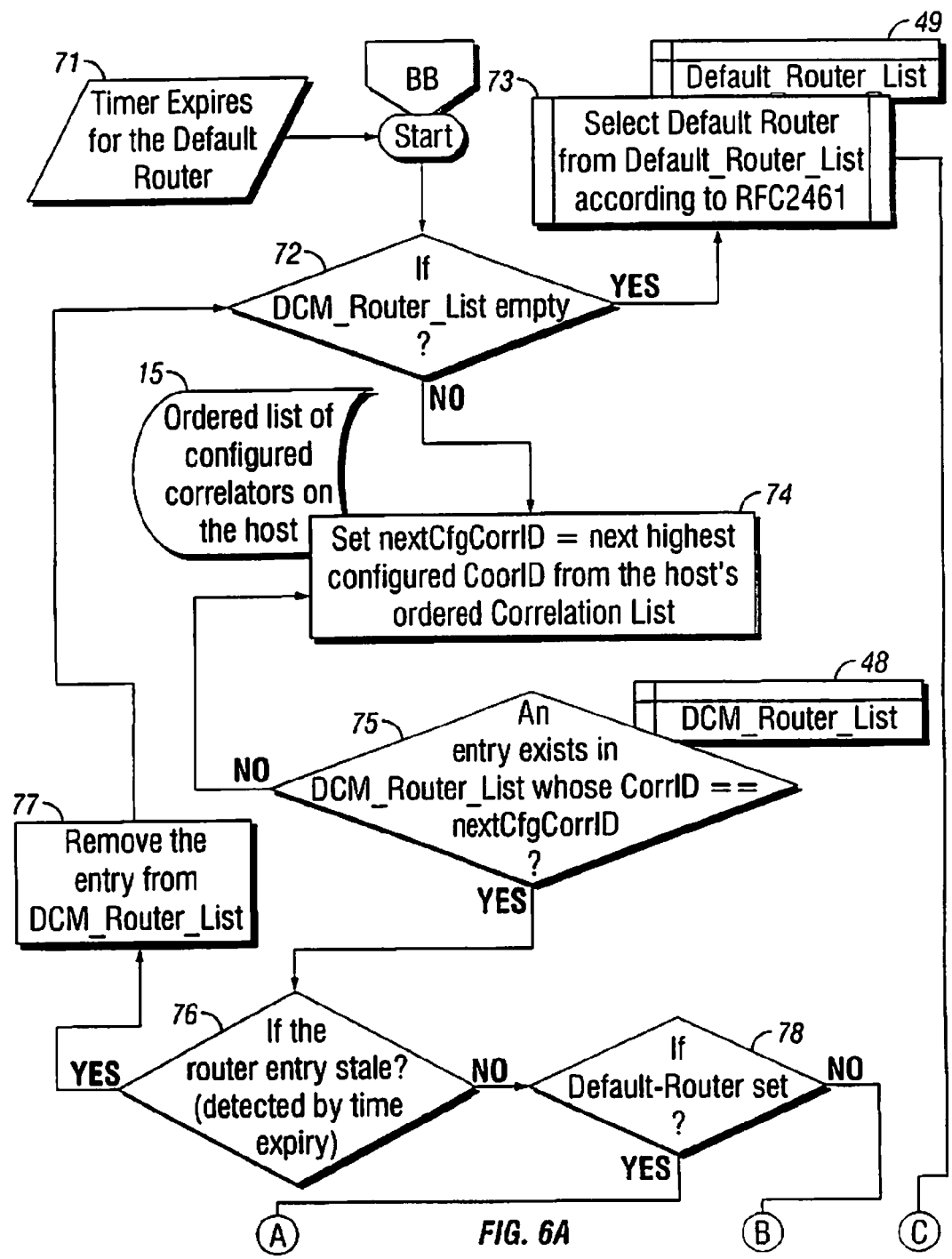
FIG. 6A is a flow chart illustrating the steps of an exemplary embodiment of the method of the present invention wherein a host selects a default router.
Figure 6B:
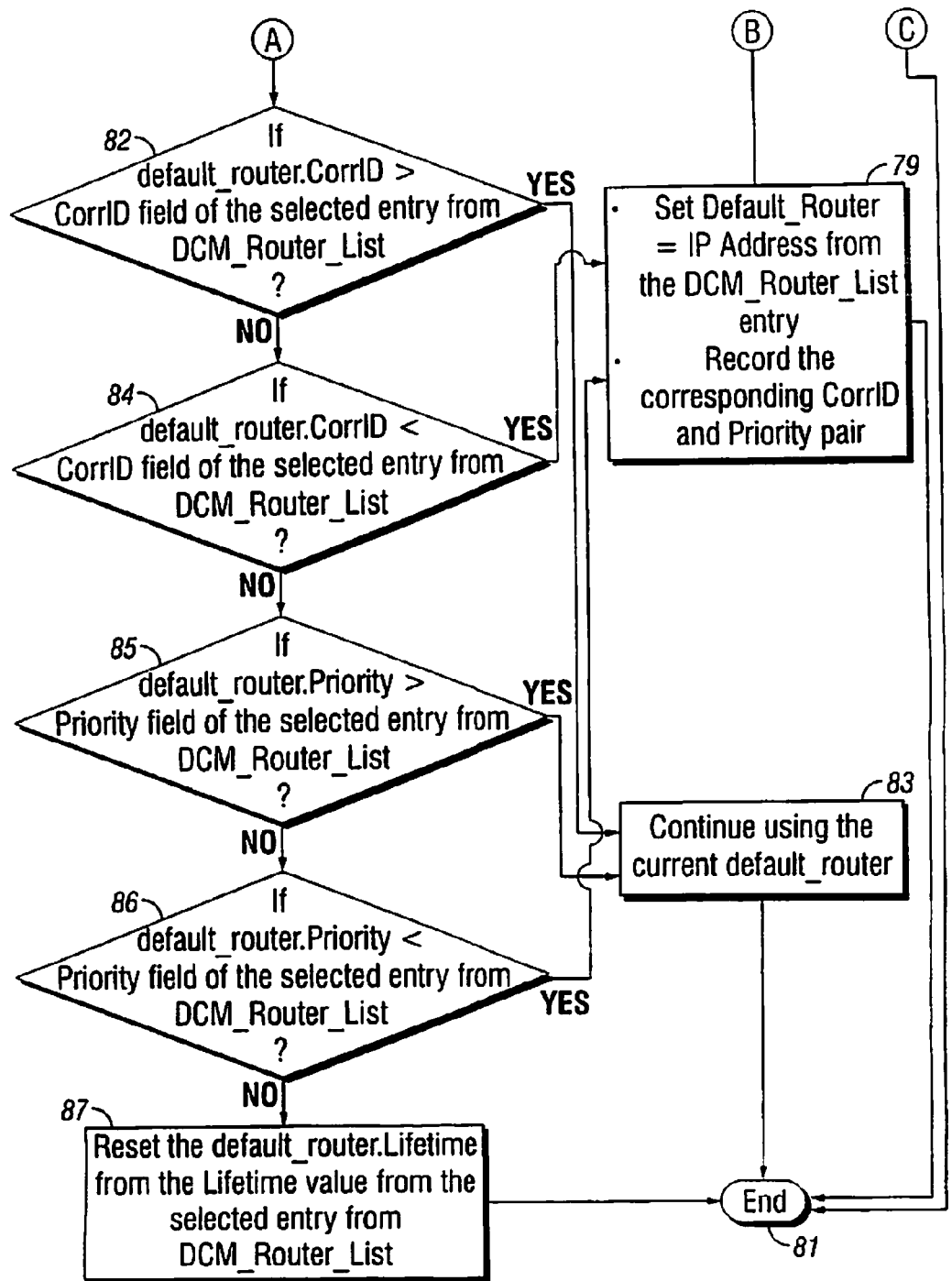

FIG. 6 is a flow chart illustrating the steps of an exemplary embodiment of the enhanced default router selection process 63. The host process depicted in FIG. 6 selects the most preferred router first from the DCM_Router_List 48 if the list is not empty. If the list is empty, then the process selects a router from the RFC-compliant Default_Router_List 49.

At step 71, the host's invalidation timer expires for its default router. At step 72 it is determined whether the DCM_Router_List 48 is empty. If so, the process moves to step 73 where the host selects a default router from the RFC-compliant Default_Router_List 49. However, if the DCM_Router_List is not empty, the process moves to step 74 where the host sets the nextCfgCorrID equal to the next highest configured correlation ID from the host's ordered correlation list (i.e., the table of correlation values 15). At step 75, it is determined whether an entry exists in the DCM_Router_List whose correlation value equals the next correlation value in the host's table. If not, the process returns to step 74. However, if such an entry exists, the process moves to step 76 where it is determined whether the router entry state was detected to be stale due to a timer expiry. If so, the process moves to step 77 where the entry is removed from the DCM_Router_List. The process then returns to step 72.

However, if it is determined at step 76 that the router entry state was not determined to be stale due to a timer expiry, the process moves to step 78 where it is determined whether the default router is set. If not, the process moves to step 79 where the default router is set as the IP address from the DCM_Router_List entry. The host records the corresponding correlation/priority pair, and the process ends at step 81. However, if the default router is set, the process moves to step 82 where it is determined whether the default router correlation value is greater than the correlation value field of the selected entry from the DCM_Router_List. If so, the process moves to step 83 where the host continues to use the current default router. The process then ends at step 81. However, if the default router correlation value is not greater than the correlation value field of the selected entry from the DCM_Router_List, and the process moves to step 84 where it is determined whether the default router correlation value is less than the correlation value field of the selected entry from the DCM_Router_List. If so, the process returns to step 79. If not, the process moves to step 85 where it is determined whether the default router priority is greater than the priority field of the selected entry from the DCM_Router_List. If so, the process returns to step 83. If not, the process moves to step 86 where it is determined whether the default router priority is less than the priority field of the selected entry from the DCM_Router_List. If so, the process returns to step 79. If not, the process moves to step 87 where the host resets the default router lifetime from the lifetime value from the selected entry from the DCM_Router_List. The process then ends at step 81.

Figure 7:
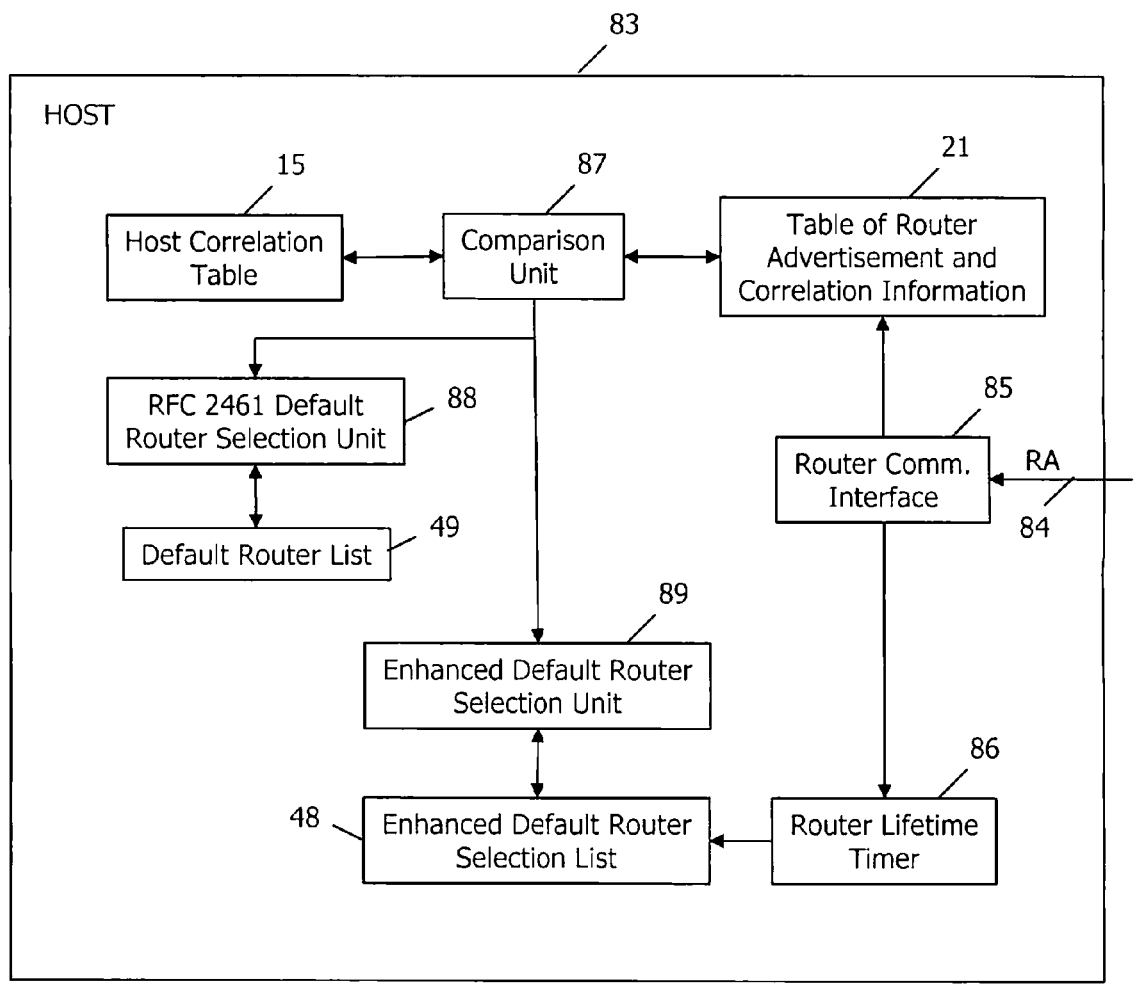
FIG. 7 is a simplified block diagram of a host modified in accordance with the present invention.

FIG. 7 is a simplified block diagram of an exemplary host 83 modified in accordance with the present invention. An RA message 84 is received by a router communications interface 85. Information from the originating router is extracted from the options field of the RA message and is used to populate the table of Router Advertisement and correlation information 21 as shown in FIG. 3. Information regarding the router lifetime is also provided to a router lifetime timer 86. If a router's lifetime expires, the router is removed from the enhanced default router selection list 48.

A comparison unit 87 compares the Router Advertisement and correlation information in the table 21 with the correlation values and preference levels in the host correlation table 15 (FIG. 2). If none of the advertising routers meet the criteria shown in FIG. 5, the comparison unit notifies an RFC 2461 default router selection unit 88, which selects a default router from the default router list 49 using conventional selection procedures. If one or more of the advertising routers meet the criteria shown in FIG. 5, the comparison unit notifies an enhanced default router selection unit 89, which selects a default router from the enhanced default router selection list 48 using the procedures shown in FIG. 6.

The present invention thus provides a system and method for assigning routers to hosts that overcomes the disadvantages of the prior art. In particular, various embodiments of the invention extend standard Router Discovery methods to provide a correlation process that deterministically tells the host precisely which router it should be using for its default router.

As will be recognized by those skilled in the art, the innovative concepts described in the present application can be modified and varied over a wide range of applications. Although the disclosure herein describes the invention in the IPv6 environment with Router Discovery, it is equally applicable to the IPv4 environment for Router Discovery. For example, the present invention can be applied as an enhancement to Home Agent (HA) and Foreign Agent (FA) selection mechanism in Mobile IPv4 deployment as specified in RFC3344. Additionally, the present invention can be applied as an enhancement to IPv6 Home Agent (HA) selection in Mobile IPv6 deployment according to RFC3775. Accordingly, the scope of patented subject matter should not be limited to any of the specific exemplary teachings discussed above, but is instead defined by the following claims.

What is claimed is:

1. A method in an Internet Protocol (IP)-based network for defining to a host, a specific router for the host to utilize as a default router, said method comprising the steps of:
    configuring in the host, a correlation value associated with routers from which the host receives Router Advertisement messages;
    receiving a Router Advertisement message from a given router, said Router Advertisement message including a router correlation value and a corresponding priority value; comparing
    by the host, the router correlation value received in the Router Advertisement message with the correlation value configured in the host;
    if the router correlation value received in the Router Advertisement message does not match the configured correlation value, selecting by the host, a default router from a list of candidate default routers based on advertised router characteristics; and
    if the router correlation value received in the Router Advertisement message matches the configured correlation value, selecting by the host, the given router as the host's default router.

2. A method in an Internet Protocol (IP)-based network for defining to a host, a specific router for the host to utilize as a default router, said method comprising the steps of:
    configuring in the host, a plurality of correlation values associated with routers from which the host receives Router Advertisement messages;
    assigning a different precedence level to each configured correlation value;
    receiving a Router Advertisement message from a given router, said Router Advertisement message including a router correlation value and a corresponding priority value; comparing
    by the host, the router correlation value received in the Router Advertisement message with the plurality of correlation values configured in the host;
    if the router correlation value received in the Router Advertisement message matches a configured correlation value having a higher preference level than the host's current default router, selecting by the host, the given router as the host's new default router; and
    if the router correlation value received in the Router Advertisement message does not match a configured correlation value having a higher preference level than the host's current default router, retaining the host's current default router as the host's default router.

3. A method in an Internet Protocol (IP)-based network for defining to a host, a specific router for the host to utilize as a default router, said method comprising the steps of:
    configuring in the host, a plurality of correlation values associated with routers from which the host receives Router Advertisement messages, wherein each configured correlation value has a different corresponding preference level;
    receiving a plurality of Router Advertisement messages from a plurality of routers, each of the Router Advertisement messages including at least one router correlation value and at least one corresponding priority value;
    identifying by the host, matching pairs of received router correlation values and configured correlation values;
    identifying by the host, which matching pair of correlation values has a highest corresponding preference level;
    identifying by the host, the router that sent the router correlation value in the matching pair having the highest corresponding preference level; and
    selecting by the host, the identified router as the host's current default router.

4. The method as recited in claim 3, further comprising:
    receiving an additional Router Advertisement message from an additional router, said additional Router Advertisement message including at least one additional router correlation value and at least one corresponding priority value;
    determining by the host, whether the additional router correlation value matches any of the configured correlation values; and
    if the additional router correlation value matches a configured correlation value having a higher preference level than the host's current default router, selecting by the host, the additional router as the host's new default router.

5. The method as recited in claim 4, wherein if the additional router correlation value matches a configured correlation value having a lower preference level than the host's current default router, retaining the host's current default router as the host's default router.

6. The method as recited in claim 5, wherein if the additional router correlation value matches a configured correlation value having a preference level equal to the host's current default router, performing the steps of:
    comparing the priority value corresponding to the correlation value received from the current default router with the priority value corresponding to the additional correlation value;
    if the priority value corresponding to the additional correlation value is higher than the priority value corresponding to the correlation value received from the current default router, selecting by the host, the additional router as the host's new default router; and
    if the priority value corresponding to the additional correlation value is lower than the priority value corresponding to the correlation value received from the current default router, retaining the host's current default router as the host's default router.

7. The method as recited in claim 4, further comprising adding to the plurality of correlation values configured in the host, the additional correlation value and corresponding priority value received from the additional router.

8. The method as recited in claim 3, wherein if there are no matching pairs of received router correlation values and configured correlation values, selecting by the host, a default router from a list of candidate default routers based on advertised router characteristics.

9. The method as recited in claim 3, wherein if a Router Discovery Correlation Message with type-length-value (DCM TLV) is not available to the host, selecting by the host, a default router from a list of candidate default routers based on advertised router characteristics.

10. The method as recited in claim 3, further comprising removing from the plurality of correlation values configured in the host, values received from any router whose router lifetime has expired.

11. A system within a host processor in an Internet Protocol (IP)-based network for defining a specific router for the host to utilize as a default router, said system comprising:
- a communications interface for receiving a plurality of Router Advertisement messages from a plurality of routers, each of the Router Advertisement messages including at least one router correlation value and an optional corresponding priority value;
- a first memory device for storing the received router correlation values and optional corresponding priority values;
- a second memory device for storing a plurality of correlation values configured on the host, wherein each correlation value may have a different corresponding precedence level;
- a comparison unit for identifying matching pairs of received router correlation values and configured correlation values as well as matching optional received priority values with a previously selected priority value and for identifying a router that sent the router correlation value that matched the correlation value having the highest corresponding precedence level; and
- an enhanced default router selection unit for selecting the identified router as the host's default router.

12. The system as recited in claim 11, wherein the comparison unit is adapted to send a notification to a conventional default router selection unit in response to a determination that there are no matching pairs of received router correlation values and preferred correlation values.

13. The system as recited in claim 11, wherein the enhanced default router selection unit is adapted to retain a previously selected default router in response to a determination that the preference level of the matching pair having a highest corresponding preference level is lower than a preference level corresponding to the previously selected default router.

14. The system as recited in claim 11, wherein in response to a determination that more than one router sent a router correlation value that matched a preferred correlation value having a highest corresponding preference level, the enhanced default router selection unit is adapted to select as the default router, a router sending a highest priority value.

15. The system as recited in claim 11, wherein the enhanced default router selection unit selects the default router from a list of candidate default routers, and the system further comprises a router lifetime timer which removes a router from the list of candidate default routers when the router's lifetime expires.

* * * * *